United States Patent
De Luca

(10) Patent No.: US 9,206,987 B2
(45) Date of Patent: *Dec. 8, 2015

(54) WIRE MESH THERMAL RADIATIVE ELEMENT AND USE IN A RADIATIVE OVEN

(71) Applicant: De Luca Oven Technologies, LLC, San Francisco, CA (US)

(72) Inventor: Nicholas P. De Luca, Carmel-by-the-Sea, CA (US)

(73) Assignee: De Luca Oven Technologies, LLC

( * ) Notice: Subject to any disclaimer, the term of this patent is extended or adjusted under 35 U.S.C. 154(b) by 50 days.

This patent is subject to a terminal disclaimer.

(21) Appl. No.: 13/953,462

(22) Filed: Jul. 29, 2013

(65) Prior Publication Data

US 2013/0313245 A1 Nov. 28, 2013

Related U.S. Application Data

(63) Continuation of application No. 12/345,939, filed on Dec. 30, 2008, now Pat. No. 8,498,526.

(51) Int. Cl.
| | |
|---|---|
| *A21B 2/00* | (2006.01) |
| *F24C 7/04* | (2006.01) |
| *H05B 3/00* | (2006.01) |
| *F24C 7/06* | (2006.01) |
| *F24C 7/08* | (2006.01) |

(52) U.S. Cl.
CPC ............... *F24C 7/043* (2013.01); *F24C 7/065* (2013.01); *F24C 7/081* (2013.01); *F24C 7/088* (2013.01); *H05B 3/0076* (2013.01)

(58) Field of Classification Search
None
See application file for complete search history.

(56) References Cited

U.S. PATENT DOCUMENTS

| | | | |
|---|---|---|---|
| 3,692,975 | A | 9/1972 | Markus et al. |
| 3,813,215 | A | 5/1974 | Ward |
| 4,238,995 | A | 12/1980 | Polster |
| 4,317,025 | A | 2/1982 | Starnes |
| 4,581,522 | A | 4/1986 | Graham |
| 4,734,562 | A | 3/1988 | Amano et al. |
| 5,097,112 | A | 3/1992 | Kanaya et al. |
| 5,250,775 | A | 10/1993 | Maehara et al. |
| 5,598,769 | A | 2/1997 | Luebke et al. |
| 5,688,423 | A | 11/1997 | Rudewicz et al. |
| 5,783,927 | A | 7/1998 | Chen |
| 5,786,568 | A | 7/1998 | McKinney |

(Continued)

FOREIGN PATENT DOCUMENTS

| | | |
|---|---|---|
| DE | 10200530 A | 7/2003 |
| EP | 1580145 A | 9/2005 |

OTHER PUBLICATIONS

"Smoke detector," http://en.wikipedia.org/wiki/Smoke.sub.—detector, Retrieved on Jul. 17, 2007, pp. 1-7. cited by applicant.

(Continued)

*Primary Examiner* — Thor Campbell
(74) *Attorney, Agent, or Firm* — Capitol City TechLaw; Jasbir Singh

(57) ABSTRACT

A high speed cooking apparatus employing a low voltage high current system for heating foods employing a novel wire mesh heating element. The system herein described providing the benefits of high speed cooking like that further described by U.S. Provisional Application 60/822,028 filed on Aug. 10, 2006, but yet providing significant cost benefit and simplicity over said system.

23 Claims, 4 Drawing Sheets

(56) References Cited

U.S. PATENT DOCUMENTS

| | | |
|---|---|---|
| 5,786,569 A | 7/1998 | Westerberg |
| 5,816,797 A | 10/1998 | Shoenfeld |
| 5,833,295 A | 11/1998 | Farlow, Jr. |
| 5,982,645 A | 11/1999 | Levran et al. |
| 6,013,900 A | 1/2000 | Westerberg et al. |
| 6,037,571 A | 3/2000 | Christopher |
| 6,049,063 A | 4/2000 | Barber |
| 6,297,481 B1 | 10/2001 | Gordon |
| 6,369,366 B1 | 4/2002 | Mullen |
| 6,670,586 B2 | 12/2003 | Ingemanson et al. |
| 7,002,265 B2 | 2/2006 | Potega |
| 7,105,778 B1 | 9/2006 | DeLong et al. |
| 7,105,779 B2 | 9/2006 | Shei |
| 7,212,735 B2 | 5/2007 | Konishi |
| 7,238,921 B2 | 7/2007 | Beesley et al. |
| 7,507,938 B2 | 3/2009 | McFadden |
| 7,797,204 B2 | 9/2010 | Balent |
| 8,498,526 B2 * | 7/2013 | De Luca .................. 392/416 |
| 2002/0166890 A1 | 11/2002 | Hsuan et al. |
| 2003/0016954 A1 | 1/2003 | Bikhovsky |
| 2005/0100331 A1 | 5/2005 | Konishi |
| 2006/0122738 A1 | 6/2006 | Yamada et al. |
| 2006/0254432 A1 | 11/2006 | McLemore |
| 2007/0194011 A1 | 8/2007 | McFadden |
| 2007/0251397 A1 | 11/2007 | Dorsten et al. |
| 2008/0037965 A1 | 2/2008 | De Luca |
| 2008/0213449 A1 | 9/2008 | Wisner et al. |
| 2010/0166397 A1 | 7/2010 | De Luca |
| 2010/0169196 A1 | 7/2010 | De Luca |
| 2010/0266738 A1 | 10/2010 | Wisner et al. |

OTHER PUBLICATIONS

Final Office Action for U.S. Appl. No. 12/345,939 dated Sep. 6, 2012.
International Search Report and Written Opinion mailed Jun. 27, 2008 for Application No. PCT/US2007/017801 filed Aug. 10, 2007. cited by applicant .
Non-final Office Action for U.S. Appl. No. 12/345,939 dated Feb. 23, 2012.
Notice of allowance for U.S. Appl. No. 12/345,939 dated Apr. 4, 2013.
Non-final office action from U.S. Appl. No. 14/643,112 mailed Sep. 25, 2015.

* cited by examiner

WIRE MESH THERMAL RADIATIVE ELEMENT AND USE IN A RADIATIVE OVEN

CROSS-REFERENCE TO RELATED APPLICATIONS

The present application is a continuation of U.S. patent application Ser. No. 12/345,939 filed Dec. 30, 2008, which is incorporated in its entity by reference for all purposes.

The following invention relates to the use of stored energy in combination with an infrared heating source consisting of a wire screen mesh element for the purpose of cooking or toasting.

BACKGROUND OF THE INVENTION

U.S. Provisional Application 60/822,028 filed on Aug. 10, 2006 and co-pending patent application describe an oven capable of cooking foods at accelerated times compared to conventional ovens.

Specifically, the oven described consists of a stored energy system, a switching system, a food holder, and radiant heat bulbs used to cook the food. Typical cook times (in seconds) for a system running about 20 KW of power are described below:

| | |
|---|---|
| Thin Slice Toast (white bread) | 3.5 |
| Bagel Half (plain) | 5 |
| Hog Dog (directly from refrigerator) | 20 |
| Pizza (directly from freezer) | 22 |
| Bacon Strips (grilled in fat) | 30-40 |
| Grilled Cheese Sandwich | 10-15 |

The radiant heat bulbs are central to the prior art as they produce the appropriate wavelength of infrared energy required (in the range of 1 to 3 nanometers) and the multiple bulbs provide the intensity. Typical bulbs include halogen based bulbs similar to those produced by companies such as Ushio, Sylvania, or Soneko with power density of approximately 100 w/in2. Although these bulbs are effective at reducing cook times, they have several primary draw backs which have to this point deterred the prior art from successful introduction in the marketplace. Specifically;
1) The price for bulbs is high relative to the entire price required to commercialize a unit such as a toaster.
2) Bulbs can easily get damaged by oils and grease common in the cooking process.
3) Use of glass shielding over the bulbs decreases the intensity of the radiant energy.
4) Although fewer, longer, high voltage bulbs can be used, the voltage poses safety risks and therefore, low voltages are preferable. Unfortunately though, the use of smaller bulbs further requires that many bulbs be used; complicating manufacturing and overall pricing issues.

Another method for heating involves the use of Nichrome wire. Nichrome wire is commonly used in appliances such as hair dryers and toasters as well as used in embedded ceramic heaters. The wire has a high tensile strength and can easily operate at temperatures as high as 1250 degrees Celsius.

Nichrome has the following physical properties:

| Material property | Value | Units |
|---|---|---|
| Tensile Strength | $2.8 \times 10^8$ | Pa |
| Modulus of elasticity | $2.2 \times 10^{11}$ | Pa |
| Specific gravity | 8.4 | None |
| Density | 8400 | kg/m$^3$ |
| Melting point | 1400 | ° C. |
| Electrical resistivity at room temperature | $1.08 \times 10^{-6}$[1] | $\Omega \cdot$ m |
| Specific heat | 450 | J/kg° C. |
| Thermal conductivity | 11.3 | W/m/° C. |
| Thermal expansion | $14 \times 10^{-6}$ | m/m/° C. |

Standard ambient temperature and pressure used unless otherwise noted.

When considering the use of Nichrome within an oven it is important to consider not only the resistive characteristics but also the black body emission of the element when hot.

With regard to the general characterization of resistive elements,

The resistance is proportional to the length and resistivity, and inversely proportional to the area of the conductor.

$$R = \frac{L}{A} \cdot \rho = \frac{L}{A} \cdot \rho_0(\alpha(T - T_0) + 1) \qquad \text{Eq. 1}$$

where $\rho$ is the resistivity:

$$\rho = \frac{1}{\sigma};$$

L is the length of the conductor, A is its cross-sectional area, T is its temperature, $T_0$ is a reference temperature (usually room temperature), $\rho_0$ is the resistivity at $T_0$, and $\alpha$ is the change in resistivity per unit of temperature as a percentage of $\rho_0$. In the above expression, it is assumed that L and A remain unchanged within the temperature range. Also note that $\rho_0$ and $\alpha$ are constants that depend on the conductor being considered. For Nichrome, $\rho_0$ is the resistivity at 20 degrees C. or $1.10 \times 10^{-6}$ and $\alpha=0.0004$. From above, the increase in radius of a resistive element by a factor of two will decrease the resistance by a factor of four; the converse is also true.

Regarding the power dissipated from a resistive element, where, I is the current and R is the resistance in ohms, v is the voltage across the element, from Ohm's law it can be seen that, since v=iR, $$P=i^2R$$

In the case of an element with a constant voltage electrical source, such as a battery, the current passing through the element is a function of its resistance. Replacing R from above, and using ohms law, $$P=v^2/R=v^2A/\rho_0L \qquad \text{Eq. 2}$$

In the case of a resistive element such as a nichrome wire the heat generated within the element quickly dissipates as radiation cooling the entire element.

Now, considering the blackbody characterization of the element:

Assuming the element behaves as a blackbody, the Stefan-Boltzmann equation characterizes the power dissipated as radiation:

$$W=\sigma \cdot A \cdot T^4 \qquad \text{Eq. 3}$$

Further, the wavelength $\lambda$, for which the emission intensity is highest, is given by Wien's Law as:

$$\lambda_{max} = \frac{b}{T} \qquad \text{Eq. 4}$$

Where,

σ is the Stefan-Boltzmann constant of $5.670 \times 10^{-8}$ W·m$^{-2}$·K$^{-4}$ and, b is the Wien's displacement constant of $2.897 \times 10-3$ m·K.

In an application such as a cooking oven, requiring a preferred operating wavelength of 2 microns (2×10E−6) for maximum efficiency, the temperature of the element based on Wein's Law should approach 1400 degrees K or 1127 degrees C. From the Stefan-Boltzmann equation, a small oven with two heating sides would have an operating surface area of approximately 4×0.25 m×0.25 m or 0.25 m2. Thus, W should approach 20,000 Watts for the oven.

In the case of creating a safe high power toaster or oven it is necessary for the system to operate at a low voltage of no more than 24 volts. Thus, using Eq. 2 with 20,000 W, the element will have a resistance of approximately 0.041 ohms, if 100% efficient at the operating temperature. Based on Eq. 1, a decrease in operating temperature to room temperature (from 1400 to 293 k) represents an approximate decrease in the resistivity of the element by about 1.44 times, and therefore an element whose resistance at room temperature is 0.0284 ohms is required.

Now, considering the relationship of the resistance of the element and the characterization of the element as a blackbody:

The ratio of the resistance of the heater to the black body raditive area of the same heater becomes the critical design constraint for the oven; herein termed the De Luca Element Ratio. The ideal oven for foods operating over a 0.25 square meter area at 2 micron wavelength has a De Luca Element Ratio (at room temperature), of 0.1137 ohms/m2 (0.0284 ohms/0.25 m2). The De Luca Element Ratio is dependant solely on the resistance of the material and the radiative surface area but is independent of the voltage the system is operated. In addition, for wire, the length of the wire will not change the ratio.

Table 1 lists the resistance per meter of several common nichrome wire sizes as well as the De Luca Element Ratio for these elements. It is important to note that all these wires have a De Luca Element Ratio far greater than the 0.1137 required for an oven operated at 1400K, 24V, and over 0.25 m2.

Clearly the use of a single wire with a voltage placed from end-to-end in order to achieve the power requirement is not feasible.

In contrast, a household pop-toaster, operated at 120V and 1500 W, over a smaller 0.338 m2 area at 500K would require a De Luca Element Ratio of 35.5. Thus a 1 meter nichrome wire of 0.001 m radius with a 120V placed across it would work appropriately.

TABLE 1

| Wire Radius (m) | Cross Sectional Area (m2) | Resistance Per Meter Length (ohms) | Surface Area of 1 meter length (m2) | Weight Per Meter (g) | De Luca Element Ratio (at room temp) | Time To Reach 1400K At 20 kw (sec) |
|---|---|---|---|---|---|---|
| 0.01 | 3.14E−04 | 0.0034 | 0.0628 | 2637 | 0.1 | 65.4 |
| 0.0015 | 7.06E−06 | 0.15 | 0.00942 | 59.3 | 16.2 | 1.47 |
| 0.001 | 3.14E−06 | 0.30 | .00628 | 26.3 | 47.7 | 0.654 |
| .0005 | 7.85E−07 | 1.38 | .00314 | 6.6 | 438 | 0.163 |
| 0.000191 | 1.139E−07 | 11.60 | 0.00120 | 0.957 | 9670 | 0.024 |
| 0.000127 | 5.064E−08 | 24.61 | 0.00079 | 0.425 | 30856 | 0.010 |
| 0.000022 | 1.551E−09 | 771.21 | 0.000138 | 0.013 | 5580486 | 0.0003 |

Clearly a lower resistance or a higher surface area is required to achieve a De Luca Element Ratio of close to 0.1137.

One way to achieve the De Luca Ratio of 0.1137 would be to use a large element of 2 cm radius. The problem with this relates to the inherent heat capacity of the element. Note from Table 1 that to raise the temperature to 1400K from room temperature would require 65.4 seconds and thus about 0.36 KWH of energy.

This calculation is derived from the equation relating heat energy to specific heat capacity, where the unit quantity is in terms of mass is:

ΔQ=mcΔT where ΔQ is the heat energy put into or taken out of the element (where P×time=ΔQ), m is the mass of the element, c is the specific heat capacity, and ΔT is the temperature differential where the initial temperature is subtracted from the final temperature.

Thus, the time required to heat the element would be extraordinarily long and not achieve the goal of quick cooking times.

Another way for lowering the resistance is to place multiple resistors in parallel. Kirkoff's law's predict the cumulative result of resistors placed in parallel.

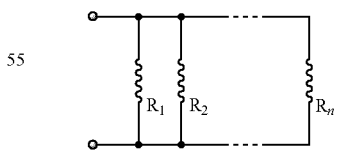

$$\frac{1}{R_{total}} = \frac{1}{R_1} + \frac{1}{R_2} + \ldots + \frac{1}{R_n} \qquad \text{Eq. 5}$$

The following Table 2 lists the number of conductors for each of the elements in Table 1, as derived using equation 5, that would need to be placed in parallel in order to achieve a De Luca Element Ratio of 0.1137. Clearly placing and distributing these elements evenly across the surface would be extremely difficult and impossible for manufacture. Also note that the required time to heat the combined mass of the elements to 1400K from room temperature at 20 KW for elements with a radius of greater than 0.0002 meters is too large with respect to an overall cooking time of several seconds.

TABLE 2

| Wire Radius (m) | De Luca Element Ratio for single element (@ Room Temp) | Number of Parallel Elements Required to Achieve De Luca Ratio of 0.1137 | Total Weight/ Meter (g) | Time To Reach 1400 K At 20 kw (sec) From Room Temp |
| --- | --- | --- | --- | --- |
| 0.01 | 0.1 | 1 | 2637 | 65.4 |
| 0.0015 | 16.2 | 12 | 711 | 17.6 |
| 0.001 | 47.7 | 22 | 579 | 14.4 |
| .0005 | 438 | 63 | 415 | 10.3 |
| 0.000191 | 9670 | 267 | 255 | 6.3 |
| 0.000127 | 30856 | 493 | 209 | 5.2 |
| 0.000022 | 5580486 | 6838 | 88 | 2.18 |

OBJECTS OF THE INVENTION

It is therefore an object of the current invention to:
1) Find a heating element capable of delivering the same power and cooking characteristics as bulbs yet be significantly less expensive.
2) It is an object of the current invention that the heating element have a temperature rise time of less than 2 seconds.
3) It is further an object of the following invention that the heat generated from the element be capable of being evenly distribution over the cooking area.
4) It is further an object of the current invention that the De Luca Element Ratio, as defined herein, of the element be close to 0.11.
5) It is also an object of the current invention that resistive nichrome element consist of an integral unit that is easy to assemble into a unit such as an oven.

SUMMARY OF THE INVENTION

In summary, the following invention allows for the creation of a high power oven by using a resistive mesh element. The heater element designed so as to allow for the desired wavelength output by modifying both the thickness of the mesh as well as the surface area from which heat radiates. The heater consisting of a single unit mesh that is easily assembled into the oven and having a low mass so as to allow for a very quick heat-up (on the order of less than a fess seconds).

Specifically, the wire mesh cloth design calibrated to have the correct De Luca Element Ratio for a fast response (less than 2 sec) oven application operating at 1400 degrees K.

To date, the best mesh design for operating a quick response time oven consisting of a nichrome wire mesh with strand diameter of 0.3 mm, and spacing between strands of 0.3 mm, and operating voltage of 24V.

DRAWINGS

The invention will now be further described in connection with the following graphs and photographs.

FIG. 1 is a graph illustrating the radiative area of a mesh element as a function of the center to center spacing of the mesh strands.

FIG. 2 is a graph illustrating the electrical resistance of a mesh element as a function of the radius of the strand and the mesh spacing.

FIG. 3 is a graph illustrating the ramp up time of a two sided 125 mm×250 mm mesh clement oven as a function of the radius of the strand and the mesh spacing and power drain of 20 KW.

FIG. 4 is a composite graph of FIGS. 1 and 2, indicating the regions applicable for high speed oven cooking with a De Luca Element Ratio close to 0.11 ohms/m2.

FIG. 5 is a photograph of a small 24V oven built using the mesh system.

FIG. 6 is a photograph of a 0.3 mm×0.3 mm mesh using 0.3 mm diameter nichrome wire which operates well at 24V across a 200 mm oven.

DESCRIPTION OF DRAWINGS

In considering the best mesh design, it is important to evaluate the blackbody radiative area as well as the resistance of the element as a function of the following:
1) The number of strands per unit area of the mesh
2) The radius of the mesh strands
3) The mesh strand material
4) The potential for radiation occlusion between strands.

Using equation 5 from above, the resistance of the mesh can be calculated for a specific wire strand radius.

Using nichrome as the strand material in the mesh and operating the system at 20 KW, the ramp up time to achieve an operating temperature of 1400 degrees K is a function of the strand radius and the mesh spacing (note that a nominal mesh size of two times 125 mm×250 mm is used).

Figure 1:
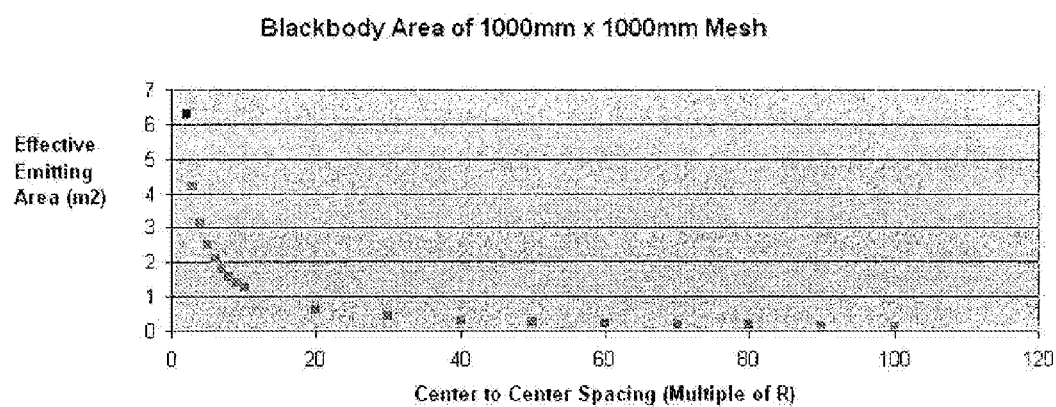
FIG. 1 describes the blackbody area as a function of the number of strands and the strand spacing of the mesh. Interestingly, the surface area is independent of the radius of the wire strand if the spacing is made a function of the radius.
Figure 2:
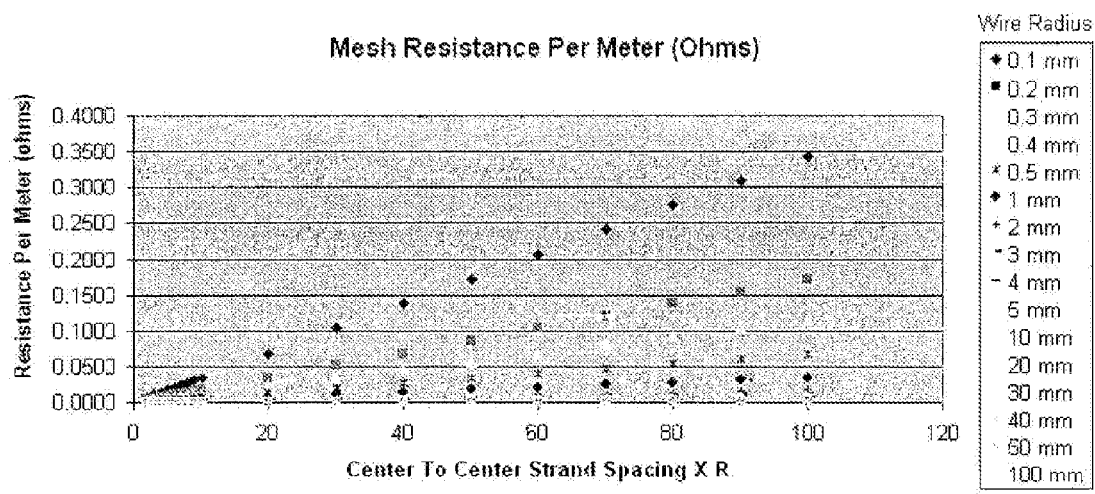
FIG. 2 illustrates the electrical resistance of a nichrome mesh element as a function of the radius of the strand and the mesh spacing. Limitation in Equation 5 become apparent as the number of strands becomes very high and the resistance becomes very low; thus atomic effects associated with random movement of electrons in the metal at room temperature form a minimum resistive threshold.
Figure 3:
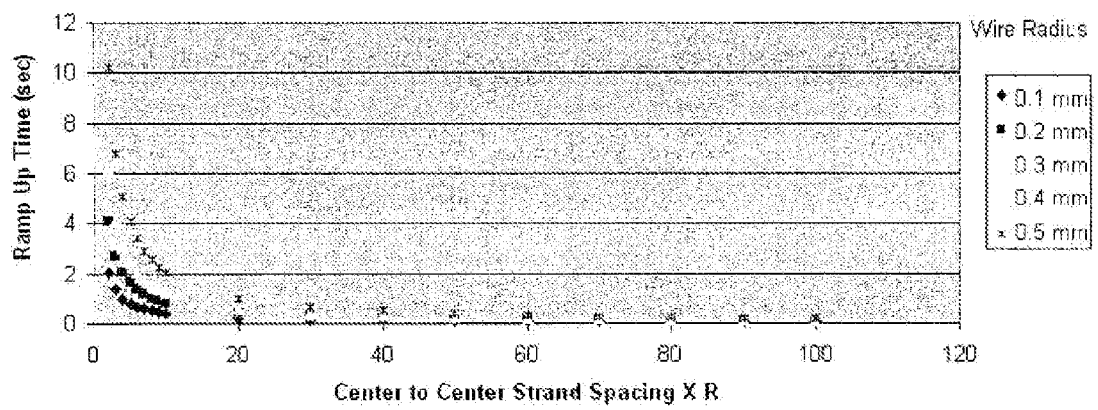
FIG. 3 illustrates the region below which a ramp up of less than 2 seconds is achievable (note that wire radius above 0.5 mm are not shown due to the long required ramp up times).
Figure 4:
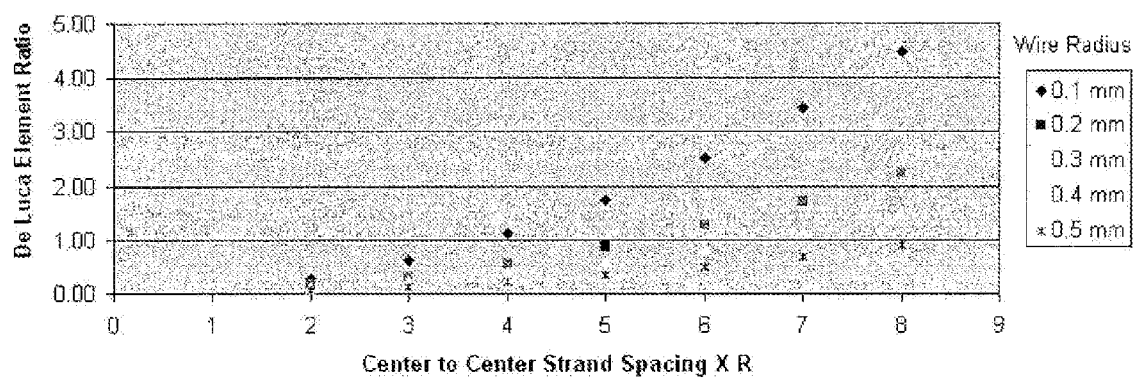
FIG. 4 is a composite graph of FIGS. 1 and 2, indicating the regions applicable for high speed oven cooking with a De Luca Element Ratio close to 0.11 ohms/m2.

The resistance across bus bars 4 and 5 as well as 6 and 7 was measured at 0.04+/−0.01 ohms. (Note that bars 4 and 6 as well as 5 and 7 are connected by cross bars 8 and 9 respectively.) Thus calculating the De Luca Element Ratio for the elements gives:

$$0.02 \text{ ohms} +/- 0.01 \text{ ohms}/0.168 \text{ m}^2 = 0.119 +/- 0.06 \text{ ohms/m}^2$$

which is within experimental error to the desired value for the De Luca Element Ratio providing the most optimal cook time. These experimental values also match closely to the expected values shown in FIG. 4.

Panels 10 and 11 are reflectors used to help focus the radiation towards the item placed in area 12.

Figure 5:
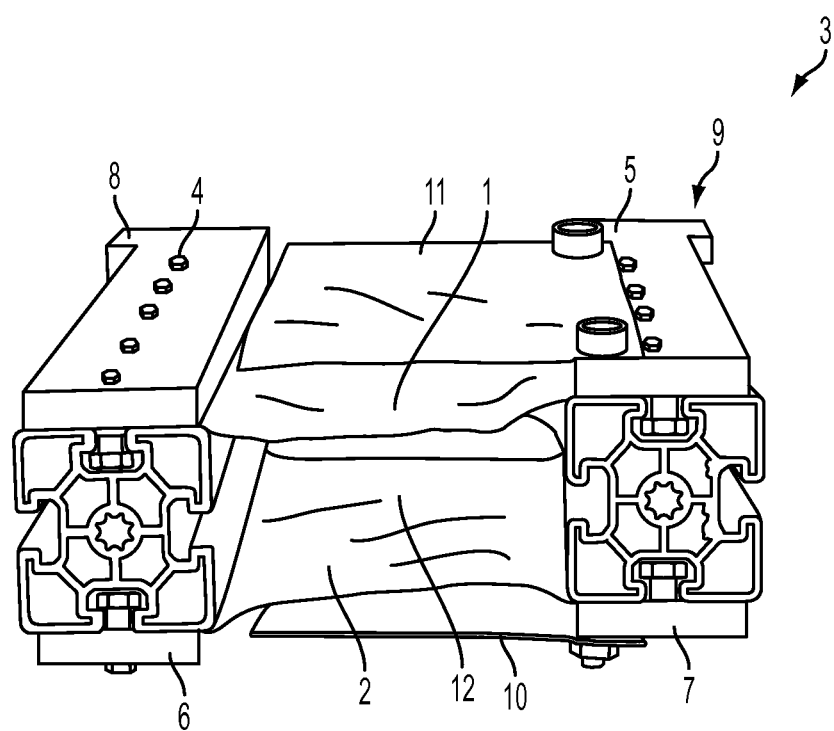
FIG. 5 is a photograph of oven 3 with top and bottom wire mesh elements 1 and 2 each 125 mm×230 mm and operated at 24V. Each wire mesh (1 and 2) has 766-125 mm long filaments woven across 416-230 mm long elements, each element 0.3 mm in diameter. A 24 V battery source is placed across the length of the 766 elements at bus bars 4 and 5. The wire surface area for a single strand of 0.14 mm diameter wire is 0.000440 m2/m. Thus, a total surface area (for combined top and bottom elements) can be calculated as Total Blackbody Radiating Area=2×0.000440×(416× 0.23+766×0.125)=0.168 m2
Figure 6:
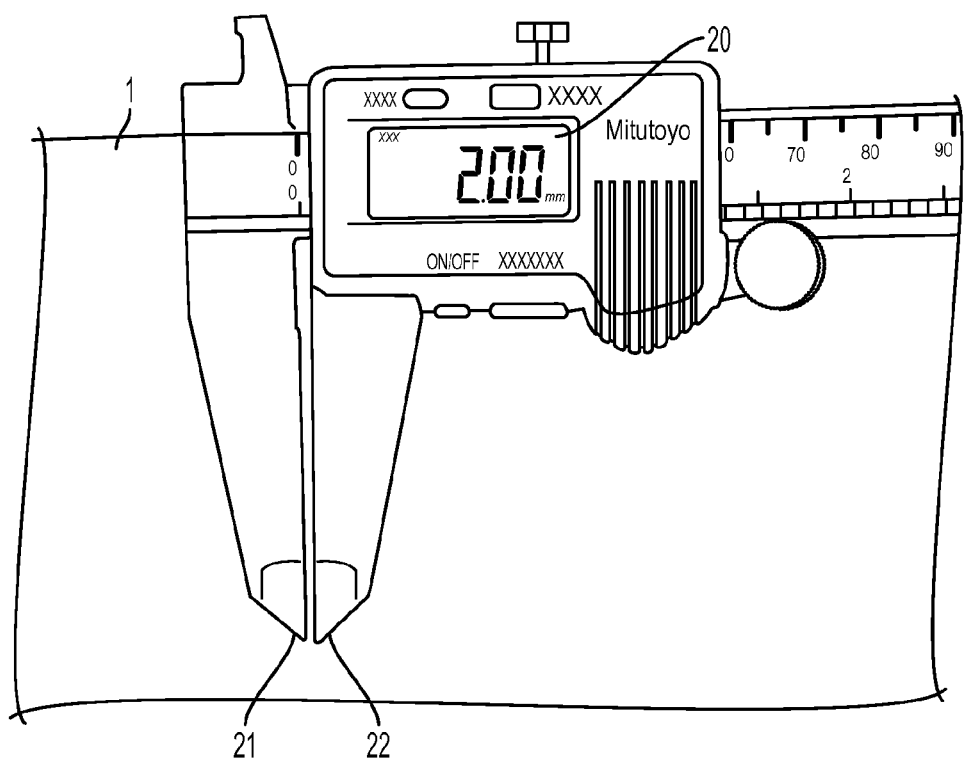

FIG. 6 is close up photograph of the wire mesh 1 from FIG. 5. Mesh 1 is a 0.3 mm×0.3 mm mesh (2×R) using 0.14 mm diameter nichrome wire and operates well at 24V. Caliper 20 has a spacing between ends 21 and 22 of 2.0 mm for reference, bounding approximately 7 strands (spacing of 0.3 mm between strands).

What is claimed is:

1. A radiant oven comprising:
   a heating cavity configured to receive a load to be heated;
   a power supply; and
   a main heater comprising a wire mesh heating element, wherein the power supply powers the wire mesh heating element and the wire mesh heating element is sized and positioned to heat the load,
   wherein a ratio of a resistance of the wire mesh heating element to a radiative black body area of the wire mesh heating element is less than 2 ohms/m$^2$.

2. The radiant oven of claim 1, wherein the wire mesh heating element comprises multiple wire mesh heating elements arranged in parallel in at least one plane.

3. The radiant oven of claim 1, further comprising a relay for cycling the power to the main heater, and a control circuit for controlling the relay.

4. The radiant oven of claim 3, further comprising:
   a fan controlled by the control circuit for exhausting air from the heating cavity; and
   a temperature sensor in communication with the control circuit.

5. The radiant oven of claim 1, wherein the wire mesh heating element is movable relative to the load.

6. The radiant oven of claim 1, wherein the wire mesh heating element comprises multiple wire mesh heaters, the multiple wire mesh heaters share a first bus and a second bus, the first bus is in electrical communication with a positive voltage of the power supply and the second bus is in electrical communication with a negative voltage of the power supply.

7. The radiant oven of claim 1, further comprising a sensor configured to monitor gases or particles emitted by the load during the heating.

8. The radiant oven of claim 1, wherein a minimum distance from the load to the wire mesh heater is not less than one half of an inch.

9. The radiant oven of claim 1, further comprising a tray configured to support the load, the tray being movably attached to a chassis of the radiant oven for adjusting the position of the tray.

10. The radiant oven of claim 1, further comprising an oven door and a reflector disposed on or in the oven door for reflecting radiation.

11. The radiant oven of claim 1, further comprising a control circuit configured to monitor a condition of the load by measuring one or more of: a color of the load, a moisture level of a surface of the load, and a moisture level of air in the oven.

12. The radiant oven of claim 1, wherein the power supply supplies a DC voltage to the wire mesh heating element.

13. The radiant oven of claim 1, the power supply comprises a battery.

14. The radiant oven of claim 1, wherein the ratio is less than 2 ohms/m$^2$.

15. The radiant oven of claim 1, wherein the wire mesh heater has a combined resistance of less than 10 ohms.

16. The radiant oven of claim 1, wherein the wire mesh heating element comprises wires having a radius less than or equal to 0.5 mm.

17. The radiant oven of claim 1, wherein the wire mesh heating element comprises a 0.3 mm X 0.3 mm wire mesh.

18. The radiant oven of claim 1, wherein the wire mesh heating element comprises a wire mesh cloth.

19. A heating method comprising:
   heating a cavity configured for receiving a load using a main heater comprising a wire mesh heating element; and
   discharging current from a power supply through the wire mesh heating element,
   wherein a ratio of a resistance of the wire mesh heating element to a radiative black body area of the wire mesh heating element is less than 2 ohms/m$^2$.

20. A radiant oven comprising:
   a cavity configured for receiving a load;
   a circuit configured to carry current supplied by a power supply; and
   a main heater comprising a wire mesh heating element, wherein the power supply powers the wire mesh heating element via the circuit and the wire mesh heating element is sized and positioned for heating the load,
   wherein the wire mesh heating elements is capable of reaching about 1400 Kelvin from room temperature in less than 10.3 seconds.

21. The radiant oven of claim 20, wherein the wire mesh heating element comprises wires having a radius less than or equal to 0.5 mm.

22. The radiant oven of claim 20, wherein the wire mesh heating element comprises a 0.3 mm X 0.3 mm wire mesh.

23. The radiant oven of claim 20, wherein the wire mesh heating element comprises a wire mesh cloth.

* * * * *